United States Patent
Siegel et al.

(10) Patent No.: US 10,776,882 B2
(45) Date of Patent: *Sep. 15, 2020

(54) PRINCIPAL GUARANTEED SAVINGS AND INVESTMENT SYSTEM AND METHOD

(71) Applicants: Richard J. Siegel, New York, NY (US); Joan M. Siegel, New York, NY (US); Phillip McNeill, Reston, VA (US); Daniel E. Setness, Torrington, CT (US)

(72) Inventors: Richard J. Siegel, New York, NY (US); Joan M. Siegel, New York, NY (US); Phillip McNeill, Reston, VA (US); Daniel E. Setness, Torrington, CT (US)

( * ) Notice: Subject to any disclaimer, the term of this patent is extended or adjusted under 35 U.S.C. 154(b) by 344 days.

This patent is subject to a terminal disclaimer.

(21) Appl. No.: 15/943,105

(22) Filed: Apr. 2, 2018

(65) Prior Publication Data

US 2018/0225772 A1   Aug. 9, 2018

Related U.S. Application Data

(63) Continuation of application No. 14/693,226, filed on Apr. 22, 2015, now Pat. No. 9,965,806, which is a
(Continued)

(51) Int. Cl.
*G06Q 40/00* (2012.01)
*G06Q 40/08* (2012.01)
*G06Q 40/06* (2012.01)

(52) U.S. Cl.
CPC ............ *G06Q 40/08* (2013.01); *G06Q 40/06* (2013.01)

(58) Field of Classification Search
CPC ............................. G06Q 40/08; G06Q 40/06
(Continued)

(56) References Cited

U.S. PATENT DOCUMENTS

| 2002/0091637 A1* | 7/2002 | Bent | G06Q 40/02 705/40 |
| 2006/0031149 A1* | 2/2006 | Lyons | G06Q 40/06 705/35 |

(Continued)

FOREIGN PATENT DOCUMENTS

| CA | 2408188 A1 * | 11/2001 | .......... G06Q 40/025 |
| WO | WO-03077067 A2 * | 9/2003 | ............. G06Q 40/06 |
| WO | WO-2004001538 A2 * | 12/2003 | ............. G06Q 40/08 |

OTHER PUBLICATIONS

Doody: "alternatives: the right medicine for your portfolio?", Healthcare Financial Management 60.1: 116-8. Healthcare Financial Management Association (Year: 2006).*

*Primary Examiner* — Edward J Baird
(74) *Attorney, Agent, or Firm* — Michael L. Greenberg, Esq.; Greenberg & Lieberman, LLC (57) ABSTRACT

A system and method for mass market hedge fund investing is proposed that preferably works in conjunction with the U.S. Treasury's Treasury Direct program for direct investment in U.S. Government securities. A primary investment in a principal-guaranteed, fixed term financial instrument, such as U.S. Government securities, including U.S. Notes, Bonds and Treasury Inflation-Protected Securities (TIPS) having principal linked to the Consumer Price Index, wherein the principal is guaranteed to the extent of the full faith and credit of the U.S. Government, generates an interest income stream. The interest stream is electronically diverted to a separate account within an aggregated pool invested in a hedge fund over a predetermined time horizon. The fund is preferably run by an experienced chief portfolio strategist and a money-management team.

7 Claims, 6 Drawing Sheets

Related U.S. Application Data continuation of application No. 11/456,793, filed on Jul. 11, 2006, now abandoned.

(58) Field of Classification Search
USPC .................................................... 705/35–40
See application file for complete search history.

(56) References Cited

U.S. PATENT DOCUMENTS

| 2007/0022033 A1* | 1/2007 | Ho ........................ G06Q 40/00 |
| | | 705/35 |
| 2007/0239583 A1* | 10/2007 | Williams ............... G06Q 40/06 |
| | | 705/36 R |

\* cited by examiner

510
Registration Screen

HedgeFundsDirect.com/registration

Please click on the underlined links accordingly:

o     Open a Treasury Direct™ account
o     Route Interest to a Hedge Funds Direct Custodian
o     Do you prefer a ⦿ self-directed or ◯ managed account?
o     Are you a⦿ qualified or ◯ non-qualified investor?
o     Select investment based upon preferences and/or time horizon
o     Keep fully informed about my money and investments

*Treasury Direct™ is a registered trademark of the U.S. Treasury

520
Status Screen

HedgeFundsDirect.com/status

Please click on the underlined links accordingly:

o     View my Hedge Funds Direct account
o     Review, update, change personal information
o     View Treasury Direct™ holdings
o     View HFD-Cash Management Account
o     View Investments, make payments, exchanges, buy and sell orders
o     Make changes to existing investments
o     Make new investments or sell existing investments
o     Make a Fast Deposit to Treasury Direct™ account

*Treasury Direct™ is a registered trademark of the U.S. Treasury

PRINCIPAL GUARANTEED SAVINGS AND INVESTMENT SYSTEM AND METHOD

RELATED APPLICATION

The present application is a continuation of U.S. application Ser. No. 14/693,226 which was filed on Apr. 22, 2015, which is a continuation of U.S. application Ser. No. 11/456,793, which was filed on Jul. 11, 2006, all of which is incorporated by reference in its entirety.

FIELD OF THE INVENTION

The present invention relates generally to the field of investments, inclusive of investing in all asset classes, and in particular to investing in hedge funds, without risking financial principal. The primary focus of the invention is to provide a method for investing in riskier assets while guaranteeing investment principal. The invention establishes principal guaranteed investments, which include, but are not limited to, hedge funds, private equity, venture capital, real estate, indices, philanthropy and investments related to all asset classes.

BACKGROUND OF THE INVENTION

Investors have begun pulling their money out of conventional investment tools, such as stocks, equity funds, bond funds, and money market funds and look toward alternative investment tools in hopes of attaining a positive return on their investment. One such alternative investment tool is a hedge fund. A hedge fund uses a pool of capital for leveraging an investment portfolio that uses a private partnership as its structural format. The private partnership consists of a General Partner, who is typically the investment manager of the fund, and Limited Partners, who are the individual investors. The General Partner receives a fee for managing the investments, but only if the fund is productive. Therefore, by heavily weighting the investment manager's fee based on performance incentives, hedge funds typically attract the brightest individuals in the investment business and thus are attractive to investors.

Historically, the primary goal of hedge funds has been to reduce volatility and risks while preserving capital and providing positive returns under all market conditions. Typically, hedge funds utilize a variety of financial strategies to minimize the risks to investors, enhance returns, and minimize the correlation between the equity and bond markets. For example, hedge funds may employ short selling or arbitrage, engage in trading derivatives, investing in the anticipation of specific events, such as mergers or acquisitions, and investing in deeply discounted securities. This versatility allows hedge funds to generate positive returns on investment regardless of whether equity and bond markets are rising or falling.

Hedge funds provide several advantages over standard mutual fund investments. First, as mentioned above, hedge funds are established to deliver absolute returns. That is, the primary goal of hedge funds is to return a profit under all circumstances—even in a Bear market. The success of mutual funds, on the other hand, is compared to a relative index, such as the Dow Jones Industrial Averages, Standard and Poor's 500, or other index. Thus, a mutual fund may have a negative return but still be considered successful if it outperforms the indices.

Another advantage is that hedge funds are particularly suited to protect investors against declining markets. Because hedge fund managers have a wide variety of hedging strategies available to them, hedge fund managers are able to generate absolute positive returns in declining markets. Mutual funds, on the other hand, are limited to converting a portion of their portfolios to cash or to shorting a limited portion of stock index futures to protect portfolios against declining markets.

Yet another advantage of hedge funds over mutual funds is that hedge funds are unregulated and, therefore, unrestricted in their investment options. Thus, managers of hedge funds are free to employ a variety of strategies to increase profits or reduce volatility. Mutual funds, on the other hand, are highly regulated and are restricted to the use of non-conventional investments, such as short selling and trading in derivatives, which make it more difficult for fund managers to outperform the market. However, conventional hedge funds have one restriction, which is imposed by professional investors. Professional investors expect and typically require that the hedge fund manager limit his or her investments within an area of specialization and competence. Thus, hedge funds tend to operate within a given specialization, which requires a particular expertise by the manager.

Although hedge funds provide a powerful alternative to and provide advantages over conventional mutual funds for investors, hedge funds have several drawbacks. First, unlike mutual funds, hedge funds are not available to the general public. Rather, hedge funds are available only to Accredited Investors and Qualified Purchasers. Accredited Investors are individuals whose net worth exceeds one million dollars, or individuals whose individual income exceeded two hundred thousand dollars, or whose joint income with a spouse exceeded three hundred thousand dollars in each of the two preceding years. Qualified Purchasers, also known as "super" Accredited Investors, are individuals, whose investments total more than five million dollars, either individually or jointly, family businesses that have more than five million dollars in investments, business that have discretion over twenty-five million dollars in investments, and trust sponsored Qualified Investors. Furthermore, only one hundred Accredited Investors, or an unlimited number of Qualified Purchasers, may invest in any single hedge fund. However, typical hedge funds have fewer than one hundred investors. Therefore, the pool of potential investors for hedge funds is limited.

One potential limitation of hedge funds is that they are not always diversified. Hedge funds are sometimes limited to a single sector, niche, or industry. Although hedge funds are designed to provide an absolute return, the non-diversification can lead to high risks and high volatility. For example, if particular hedge fund investments are limited to the technical sector (e.g., computing stocks, telecommunications stocks, etc.) the return on investments may vary widely with changes in the technical sector of the stock market. Although hedge funds are designed to minimize the volatility and risks, investing in a single sector can lead to inherent fluctuations in the rate of return, which may be more than some investors are willing to tolerate. Furthermore, investment strategies differ between different managers. Each hedge fund manager will apply different amounts of hedging and different amounts of leverage to his or her portfolio, thereby leading to different amounts of risk. The different management styles in coordination with the single sector investing of hedge funds may increase the volatility beyond the point many potential investors are willing to accept.

One method to minimize the volatility of investing in a single hedge fund was the creation of a "fund" of hedge funds, or a "fund of funds" as it is commonly known. A fund of funds mixes and matches the most successful hedge funds and pooled investment vehicles into a single fund, thereby spreading the investments among several different types of hedge funds and investment vehicles. A fund of funds mixes a variety of hedge funds and management styles to meet an investor's specific goals and risk/reward objectives while diversifying his or her portfolio. By diversifying the fund's classes and the management strategies of the fund managers, a more consistent return may be achieved. Also, the volatility of the funds can be controlled depending on the mix and ratio of investment strategies integrated into the fund. Thus, by creating a fund of funds, the goals and risk/reward objectives can be tailored to the needs of individual investors. However, the fund of funds approach has several drawbacks. First, conventional fund of funds still require that any investor must meet the requirements for an individual hedge fund. For example, fund of funds are only available to Accredited Investors and Qualified Purchasers. Furthermore, the minimum investment amounts associated with individual hedge funds also applies to the fund of funds. Moreover, the fund of funds is still a Limited Liability Partnership. Therefore, the individual investors, or limited partners, retain a substantial amount of risk.

Therefore, there is a continuing need for a method for allowing investors to participate in a single or portfolio of hedge funds managed by one or more emerging managers, or one of countless other investment vehicles, including, but not limited to REITs, indexed shares or the equivalent of Exchange Traded Funds (ETFs) related to any asset class, mutual funds, currency funds, and the like, with the security and liquidity provided by a guaranteed United States dollar or foreign-backed securities with a guarantee that is equivalent to the guarantee backed by the U.S. Government.

BRIEF SUMMARY OF THE INVENTION

The system and methods of the present application comprise one or more computers that preferably market, sell and implement a hedge fund business model. Information and computer software stored and executed on a general purpose computer provides an Investor with the ability to participate in hedge fund investments without unduly risking financial principal.

In one aspect, the present invention is directed to a method for investing in a hedge fund, comprising: selecting a first time horizon and providing financial principal to purchase a corresponding first financial instrument; selecting a second time horizon and a corresponding second financial instrument; issuing shares for the second financial instrument purchased with income from the first financial instrument; and receiving financial principal from first financial instrument at the first time horizon.

In another aspect, the method further comprises redeeming shares of the second financial instrument at the second time horizon.

In another aspect, the method further comprises monetizing an income stream from the first financial instrument to produce the income.

In another aspect, the first financial instrument is one or more instruments selected from the group consisting of U.S. Notes, U.S. Bonds, and U.S. Treasury Inflation-Protected Securities.

In another aspect, the method further comprises redeeming shares in the second financial instrument at other than the second time horizon and charging a penalty for share redemption.

In another aspect, the first time horizon and the second time horizon are an identical length of time.

In another aspect, the second time horizon is longer that the first time horizon.

In another aspect, the method further comprises periodically updating information concerning a share in the second financial instrument.

In another aspect, the information comprises a net asset value of the share.

In another aspect, the information comprises per share management fees.

In another aspect, the present invention is directed to a system for investing in a hedge fund, comprising: a display comprising on-screen controls; a processor coupled to a memory and the display; and program code stored on a media, that, when executed by the processor and in response to an investor's manipulation of the on-screen controls, causes the processor to: select a first time horizon and purchase a corresponding first financial instrument; select a second time horizon and a corresponding second financial instrument; issue shares for the second financial instrument purchased with income from the first financial instrument; and receive financial principal from first financial instrument at the first time horizon.

In another aspect, the program code further causes the processor to redeem shares in the second financial instrument at the second time horizon.

In another aspect, the program code further causes the processor to monetize an income stream from the first financial instrument to produce the income.

In another aspect, the first financial instrument is one or more financial instruments selected from the group consisting of U.S. Notes, U.S. Bonds, and U.S. Treasury Inflation-Protected Securities.

In another aspect, the program code further causes the processor to redeem shares in the second financial instrument at other than the second time horizon and charging a penalty for share redemption.

In another aspect, the first time horizon and the second time horizon are an identical length of time.

In another aspect, the second time horizon is longer that the first time horizon.

In another aspect, the program code further causes the processor to periodically update information concerning a share in the second financial instrument.

In another aspect, the information comprises a net asset value of the share.

In another aspect, the second financial instrument comprises shares in a hedge fund.

DETAILED DESCRIPTION OF THE INVENTION

The present invention comprises a system and method for implementing a hedge fund business model. The system and methods are preferably implemented by computer software stored and executed on a general purpose computer. This computer provides the Investor with the ability to direct the operation of the computer to invest in a hedge fund.

Additionally, the present invention may be described herein in terms of functional block components, code listings, optional selections and various processing steps. It should be appreciated that such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices.

Similarly, the software elements of the present invention may be implemented with any programming or scripting language such as C, C++, C#, Java, COBOL, assembler, PERL, or the like, with the various algorithms being implemented with any combination of data structures, objects, processes, routines or other programming elements. The computer code is preferably programmed in C++. The object code created for the gaming computers can preferably be executed by any computer having a Windows 98 or higher or MAC O.S. 9 or higher operating system.

Further, it should be noted that the present invention may employ any number of conventional techniques for data transmission, signaling, data processing, network control, and the like.

It should be appreciated that the particular implementations shown and described herein are illustrative of the invention and its best mode and are not intended to otherwise limit the scope of the present invention in any way. Indeed, for the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical or virtual couplings between the various elements. It should be noted that many alternative or additional functional relationships or physical or virtual connections may be present in a practical electronic data communications system.

As will be appreciated by one of ordinary skill in the art, the present invention may be embodied as a method, a data processing system, a device for data processing, and/or a computer program product. Accordingly, the present invention may take the form of an entirely software embodiment, an entirely hardware embodiment, or an embodiment combining aspects of both software and hardware. Furthermore, the present invention may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The present invention is described below with reference to block diagrams and flowchart illustrations of methods, apparatus (e.g., systems), and computer program products according to various aspects of the invention. It will be understood that each functional block of the block diagrams and the flowchart illustrations, and combinations of functional blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems that perform the specified functions or steps, or suitable combinations of special purpose hardware and computer instructions.

One skilled in the art will also appreciate that, for security reasons, any databases, systems, or components of the present invention may consist of any combination of databases or components at a single location or at multiple locations, wherein each database or system includes any of various suitable security features, such as firewalls, access codes, encryption, de-encryption, compression, decompression, and/or the like.

The scope of the invention should be determined by the appended claims and their legal equivalents, rather than by the examples given herein. For example, the steps recited in any method claims may be executed in any order and are not limited to the order presented in the claims. Moreover, no element is essential to the practice of the invention unless specifically described herein as "critical" or "essential."

System Architecture

Figure 1:
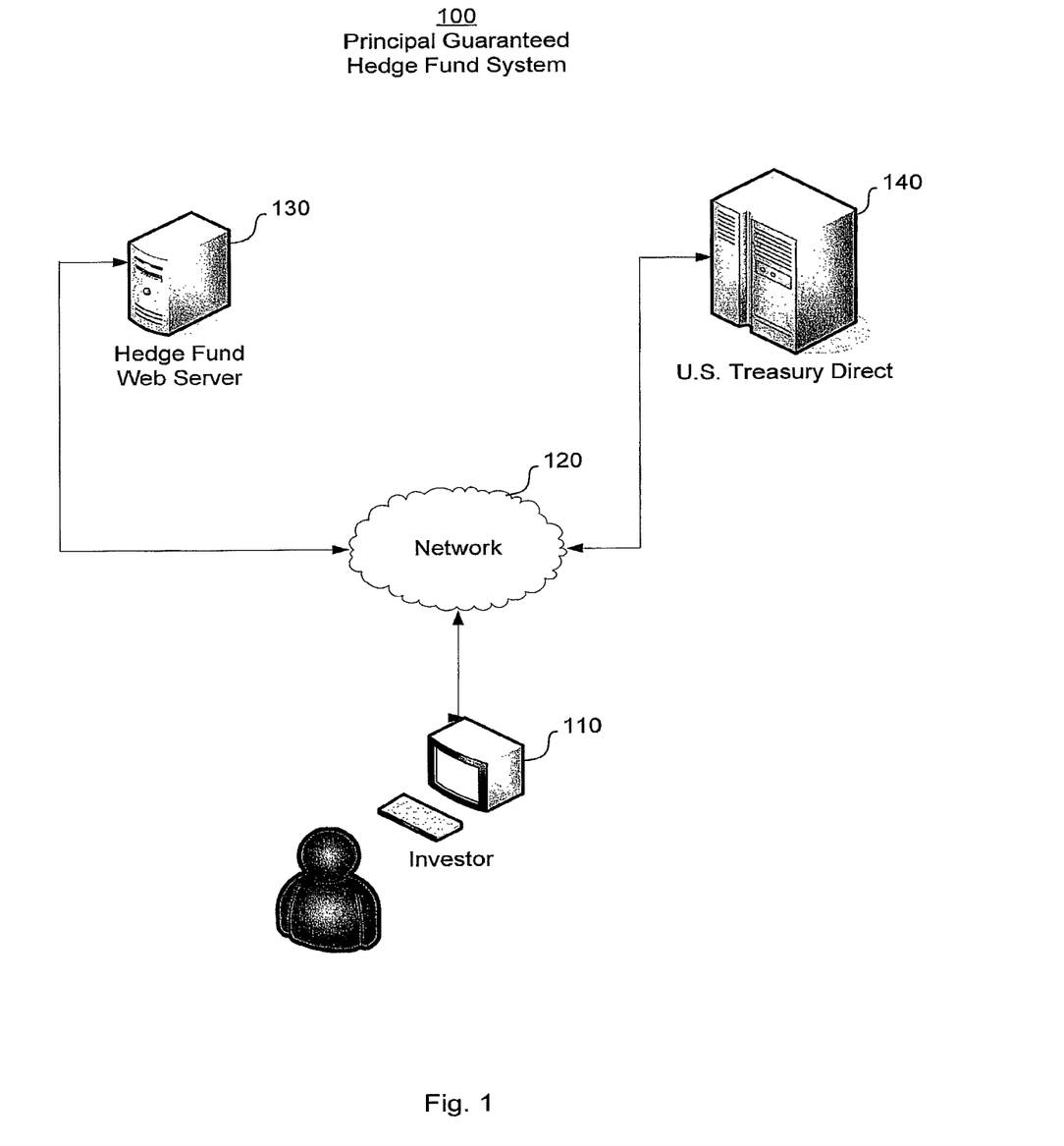
FIG. 1 is a block diagram that illustrates a networked computer system for implementing hedge fund investments.

FIG. 1 illustrates a preferred embodiment of a hedge fund investment system 100 in accordance with the invention. Referring to FIG. 1, an Investor accesses system 100 through a computing device 110 operating on widely available web browser software. Computing device 110 can be, for example, a personal computer, handheld computer, Blackberry, cellular telephone, or other web-enabled wireless or wired device. Computer 110 is coupled to a network 120 and communicates with both Hedge Fund web server 130 and the U.S. Treasury Department's Treasury Direct computers 140. Hedge Fund web server 130 provides Investor with the ability to create accounts and access information concerning Investor's hedge fund holdings. Treasury Direct computer 140 provides Investor with information concerning Investor's original issue treasury securities. Network 120 may comprise, for example, the Internet, a wide area network (WAN), or a local area network (LAN) and supplemented with various communication links via modems or other communication devices operating over a plain old telephone system.

Although Hedge Fund web server 130 is illustrated as a single computer, it should be understood that different numbers and types of computers may be utilized. For example, the server may include a plurality of networked computing devices interconnected via the network 120, provided in many different geographic locations. Network 120 may include a plurality of network computers or server computers (not shown) and associated communication links, each of which may be operatively interconnected. Where the network 120 comprises the Internet, data communication may take place over communication links via an Internet communication protocol (UDP or TCP/IP). Where the network 120 comprises a wireless network, data communication may take place over communication links via a wireless data protocol such as CDMA2000 or W-CDMA. Similarly, where the network communications comprise data, voice and video, communication may take place via an Internet communication protocol or a wireless protocol.

Figure 2:
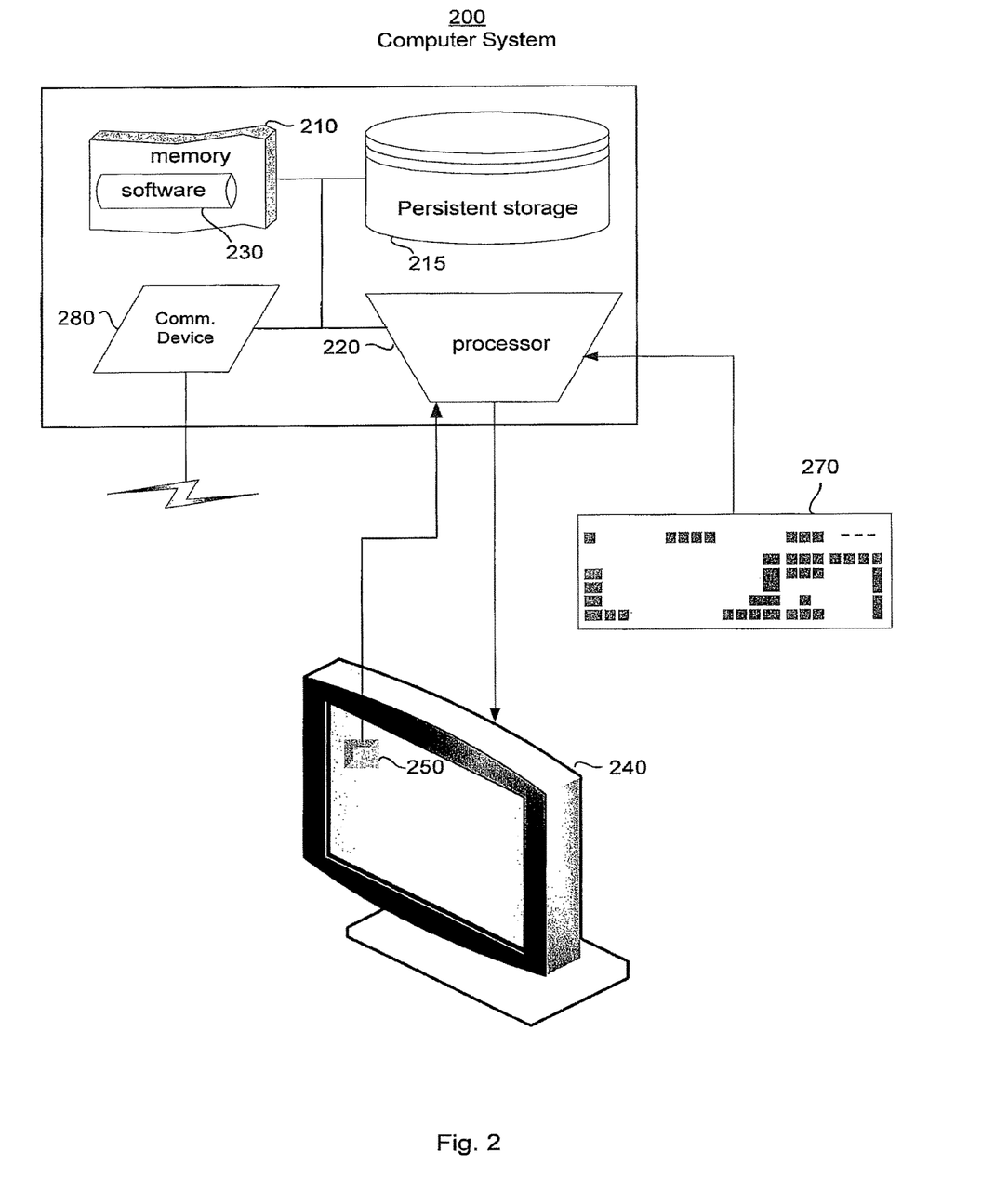
FIG. 2 is a block diagram illustrating a preferred computer system used by an Investor.

FIG. 2 illustrates an exemplary embodiment of a computer 200. Computer 200 comprises a memory 210 and a processor 220 that executes software instructions 230 loaded from a persistent data storage device 215 into high speed memory 210, a display 240 comprising on-screen controls 250 that enable the Investor to direct investments and a window area to view information, an input device 270 and a communications device 280.

Controls 250 are preferably graphically represented buttons, with symbols that are commonly found in many banking and financial web sites or other on-screen widgets to permit entry of amounts or other information.

Input device 270 may be a keyboard, mouse or other pointing device, or other information or control input device that affects the operation of computer 200, as is well known in the art.

Communications device 280 couples computer 200 with other computing devices, expanding memory capacity for information provided to display 240. Such devices may also execute software instructions loaded from persistent data storage that provide responses directed by computer 200's on-screen controls 250, thereby providing computational resources and information unavailable within the confines of computer 200's hardware.

System Operation

The Investor's holdings comprise two components. A first portion is invested into a first financial instrument designed to protect the original principal money. A financial instrument is any enforceable instrument having a monetary value. The first financial instrument preferably returns 80-100% of the Investor's principal money over a first time horizon, which is preferably fixed, and selected by the Investor. The percentage of principal guaranteed is also selected by the Investor. The first financial instrument is preferably guaranteed by the U.S. Federal Government. Alternatively, the first portion can comprise the entire amount of the Investor's principal money, and the income stream generated from the first financial instrument can be used to fund the second portion, either as an income stream over time, or converted to present value. The Investor may redeem the principal protected portion after the first time horizon ends, or perhaps earlier, but with a penalty.

The first portion preferably comprises a principal guaranteed portion, which is backed by the U.S. Government. Preferably, the first financial instrument is an investment in Treasury bonds, but can be certificates of deposit or the like, that are guaranteed through the Federal Deposit Insurance Corp. Similar direct investments in U.S. Government securities, including U.S. Notes, Bonds and Treasury Inflation-Protected Securities (TIPS) whose principal is linked to the Consumer Price Index are also contemplated. The interest stream generated by the first portion is used to generate further monetary assets by investment in a hedge fund or other investment class as explained further below.

In a preferred embodiment, at inception the Investor selects both a time horizon for securities under the U.S. Treasury Direct (UST D) program and for the interest stream generated and used to increase his hedge fund holdings. Under the USTD program, individual investors can set up an account and purchase electronic securities directly from the U.S. Treasury. Treasury Direct account holders may purchase 4, 13, and 26-Week Treasury Bills, 2 3, 5, and 10-Year Notes, and 5, 10, and 20-Year TIPS. 30-Year Bonds will also be available when they are re-introduced by Treasury. Semi-annual interest and final maturity payments are sent through the Automated Clearing House (ACH) network to the Investor's designated financial institution account. Interest and maturity payments may be sent to two different locations, depending upon the Investor's investment needs. The time horizon for the interest investment stream can be coordinated with the maturity date of the respective treasury that the Investor initially chooses. The Investor can plan with exactness for the timely payout of his guaranteed principal portion from the U.S. Government as well as the monies invested with the hedge fund or other asset class.

A second portion is invested into a second financial instrument. Preferably, the second portion is cast into a pool of money funded by a plurality of Investors. The pool is preferably managed by a hedge fund, or some other high-risk, alternative investment vehicle. In return for the Investor's contribution into the pool, shares representing the second financial instrument are granted to the Investor and are placed in the Investor's account. Money invested into the hedge fund pool is preferably used for ventures having a second time horizon that may be different from the first, fixed time horizon of the first portion. The second time horizon may be longer than the first time horizon. The Investor may not be entitled to redeem his shares in the fund without a penalty before such second time horizon is reached. In a preferred embodiment, the Investor may choose the fund from a plurality of high-risk, alternative investment funds, each having a second time horizon. In a preferred embodiment, the Investor's money will be invested in a currently embarked venture, or will be added to a pool for a prospective venture. In a further alternative preferred embodiment, the Investor may choose the type of investments that the hedge fund will invest in, but not the specific fund.

The Investor will have the unique option to choose a different time horizon for the monies invested with the hedge fund, a date different from the maturity date of the original government security investment. Preferably, the investment time horizon for the investment in the hedge fund will match the maturity date of the treasury security notes and bonds that are tentatively slated for auction by the U.S. Treasury. This would yield time frames ranging from two (2), three (3), five (5), ten (10), twenty (20) and thirty (30) years. Different time frames can be selected based on the Investor's personal criteria and choices. For example, a seven (7) year time horizon could be an option provided to bridge the gap between the Government's five (5) and ten (10) year notes. Similar time horizons could be provided for the gap between the twenty (20) and thirty (30) year notes. In a further alternative embodiment, the Investor may only choose the second time horizon, and the time horizon will be used to determine which fund his second portion will be invested in.

A small percentage of the pooled funds are used for management and research fees. Since investment in the first and second portions are automated, the management fees can be reduced, and a greater percentage of the fees can be used for research. In a preferred embodiment, research fees are levied at the beginning of the venture, and are disclosed to the investor when selecting the fund. The combined management and research fees would be reported to the investor-shareholders in the fund, thereby creating transparency and accountability.

Figure 3:
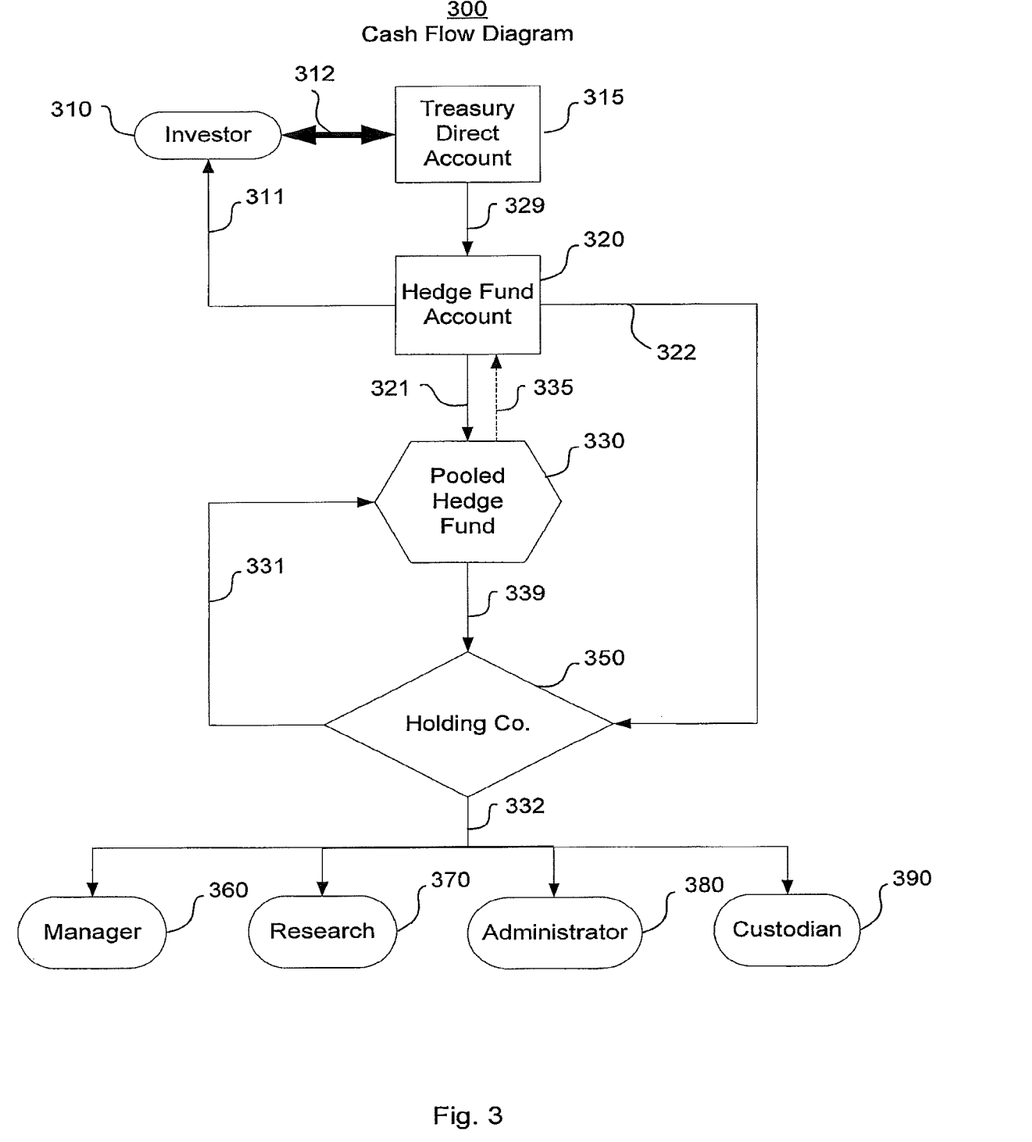
FIG. 3 is a preferred cash flow diagram for the inventive business method.

FIG. 3 illustrates a preferred cash flow diagram for the inventive business method. Several entities provide services on behalf of an Investor 310 in the hedge funds business method. Those entities include a Hedge Fund Holding Company 350, a Hedge Fund Manager 360, a Research Department 370, an Administrator 380 and a Custodian 390. Each of the entities, including Investor 310, has an electronic funds transfer (EFT) account for dispersing and receiving monies, which are preferably maintained by Custodian 390 to reduce costs as explained further below. The U.S. Government (not shown) provides a Treasury Direct account 315 for the benefit of Investor 310. In addition to the Treasury Direct account 315, Investor 310 is also provided a Hedge Funds Sales and Marketing account 320.

Holding Company 350 is responsible for promoting the business model and selecting the other entities that provide services for the inventive business method. Holding Company 350 owns the hedge funds and wields final oversight and control over money management and business processes. Holding Company 350 selects a Hedge Fund Manager 360, oversees investment results, and functions as the central point of contact for the business. A Board of Directors resides within Holding Company 350. The Board of Directors of Holding Company 350 will oversee the investment results and reserves the right to replace Hedge Fund Manager 350 if they deem such replacement prudent. Further, Holding Company 350 serves as a repository of fees, including a management fee, and issues disbursements to its investment and business professionals by agreement among the parties.

Hedge Fund Manager 360 is responsible for investing monies in a Pooled Hedge Fund 330. Hedge Fund Manager 360 has complete autonomy over investment decisions made for Pooled Hedge Fund 330. Holding Company 350 puts together a management team and allows Hedge Fund Manager 360 complete freedom to manage the money. Hedge Fund Manager 360 works for Holding Company 350, the owner of the hedge funds, and members of the management team ultimately serve at the pleasure of the Board of Directors of Holding Company 350.

Research Department 370 is responsible for discovering new investment opportunities and information for Hedge Fund Manager 360. Research Department 370 preferably utilizes an objective template to analyze companies invested in during the second time horizon, no matter the size of the company. The key features are that such objective research a) eliminates (as much as possible) the issue of "bias" in analysis of a company, by taking both a "long" and "short" perspective on all companies under analysis and b) can be used by fund managers and company CEOs to better understand their companies' operations. Only the actual research costs will accrue towards the research fees. The Director of Research, selected by the Board of Directors of Holding Company 350, has primary responsibility for overseeing the research process. The Director of Research is responsible for identifying promising new technologies that have surfaced which may have business application and also fledgling new companies whose business or technology offer a potentially exciting investment opportunity. Research Department 370 preferably has a team of individuals available to Hedge Fund Manager 360 to perform fundamental research on selected stocks and market sectors and trends.

Administrator 380 is responsible for ensuring compliance with applicable rules and regulations. Administrator 380 also provides auditing and final settlement of Investor accounts. Administrator 380 serves as the Chief Compliance Officer for the hedge funds, ensuring full compliance with the federal securities laws and Securities and Exchange Commission (SEC) directives.

Custodian 390 is responsible for maintaining all EFT accounts. Custodian 390 serves as the depository institution for the reception of the Investor's funds and serves as the custodian of the funds throughout the investment process. The Investor maintains his or her account with Holding Company 350, though the funds will remain deposited with the custodial institution, which will have a fee arrangement with Holding Company 350 for its custodial services. The reporting requirements of the U.S. banking regulations will ensure transparency with respect to the individual accounts held in custodial trust.

As shown in FIG. 3, various cash flows in the inventive business method are illustrated. Investor 310 provides principal 312 to the U.S. Government by participating in the USTD program. Principal portion 312 of the Treasury investment stays with the U.S. Treasury Department and its accounting system. Principal 312 is guaranteed, to the extent that it is backed by the full faith and credit of the U.S. Government. The U.S. Government is responsible for returning principal 312 invested in the Treasury Direct program. The safety and accountability of principal 312 is therefore unsurpassed. The crux of the invention, illustrated by FIG. 3, is the guarantee of investment principal.

The custody arrangement with Custodian 390 is prearranged at inception of the investing process. Investor 310 opens an individual electronic funds transfer account and a Hedge Fund Sales and Marketing Account 320. Such accounts are in complete compliance with all banking regulations. Holding Company 350 is provided with authorization to access accounting information pertaining to Sales and Marketing Account 320 so that it can maintain oversight of the flow of Investor's funds. Custodian 390, as a service provider, will have the primary responsibility for meeting all of the reporting requirements dictated by U.S. banking guidelines and regulations. Holding Company 350 selects the Custodian 390 and ensures that the bank selected remains viable. Preferably, by utilizing only U.S. banks and other regulated savings institutions, Holding Company 350 can provide an additional safeguard for Investor 310 as well as administrative efficiency effectuated by ever greater computer processing and redundant and secure computational resources.

By establishing a split account in the USTD program, Investor 310 elects to have interest 329 earned on principal 312 electronically transferred to Investor's Sales and Marketing Account 320. A first portion 321 of interest 329 is deposited into Pooled Hedge Fund 330. First interest portion 321 is used to purchase shares 335 (represented by a dotted line) in Pooled Hedge Fund 330, which are held on account for Investor 310 by Holding Company 350. A second portion 322 of interest 329 is provided to Holding Company 350 as a fee for investing first portion 321. Shares 335 provide a means to account for the performance of Hedge Fund 330 as explained further below. In a preferred embodiment, first portion 321 is 97% of interest 316 and second portion 322 is 3%. Investor 310 may redeem shares 335 without penalty after the selected time horizon has passed. Administrator 380 ensures that proceeds from such redemptions 311 are provided directly to Investor 310 by electronic funds transfer, allowing for full transparency in the reconciliation process.

Under management of Hedge Fund Manager 360, Pooled Hedge Fund 330 earns a certain return on investment 339. Periodically, Hedge Fund Holding Company 350 distributes a first portion of earnings 331 back into Pooled Hedge Fund 330, which are placed on account for Investor 310 in the form of shares 335. A second portion of earnings 332 are distributed to Hedge Fund Manager 360, Research Department 370, Administrator 380 and Custodian 390 in exchange for the services that they provide. In a preferred embodiment, first portion 331 is 80% of earnings 339 and second portion 332 is 20%. In a preferred embodiment, this second portion 332 is divided up per agreement with each of these entities.

The inventive business model provides transparent information and communications wherever possible. Preferably, account information, including gross earnings, net earnings, share values and fees are made available to Investor 310 by the Internet via web browser.

The following discussion describes the methods performed by the inventive system. To provide context, the operation of an exemplary, preferred embodiment of software 230 is described.

In a preferred embodiment, with reference to FIGS. 1 and 2, software 230 on computer 110 causes processor 220 to communicate with server 130 through network 120, so that various functions can be performed. Software on server 130 also causes its processor to perform the functions shown on FIG. 4. Similarly, software on the U.S. Treasury Direct computer 140 would cause its processor to help perform the functions shown on FIG. 4.

Figure 4:
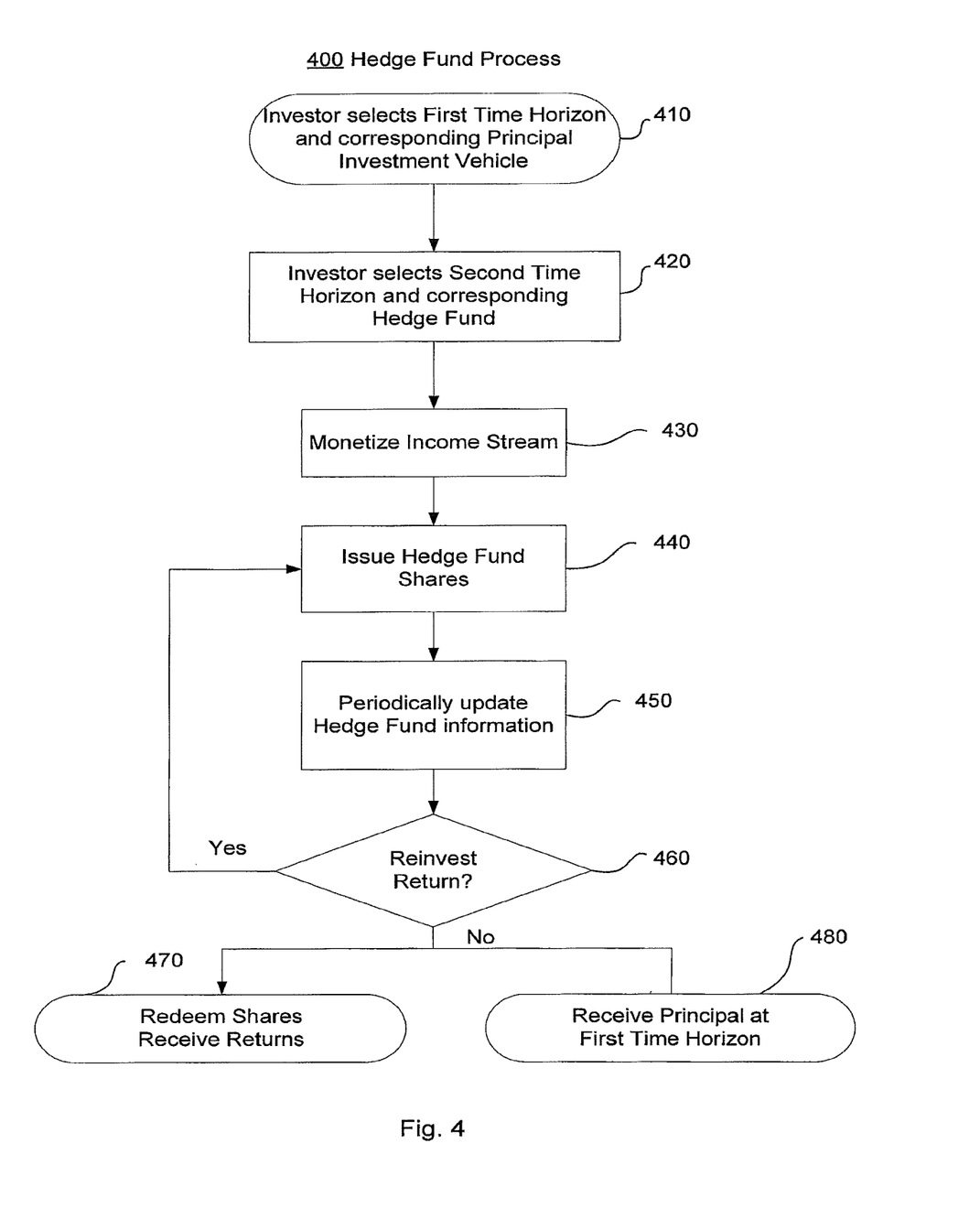
FIG. 4 is a flow chart that illustrates a method for investing in a hedge fund.

FIG. 4 is a flow chart that illustrates a method for investing in a hedge fund. As shown in FIG. 4, in step 410 an Investor selects a first time horizon and a corresponding principal investment vehicle. In a preferred embodiment, the Investor would select a U.S. Treasury security having a maturity date corresponding to the first time horizon. The Investor would elect for the interest to be transferred into his Hedge Fund Sales and Marketing account.

In step 420, the Investor selects which hedge fund or funds in which his interest should be invested. Concurrently with his selection, the Investor chooses a second time horizon that provides the Fund Manager with some expectation of how long the equity can remain in relatively illiquid ventures. The second time horizon assists the Fund Manager in making prudent investment decisions. In a preferred embodiment, each hedge fund has an associated time horizon that is automatically chosen when the investor selects that fund.

In step 430, the income stream from the principal investment vehicle is monetized. In other words, the right to receive monies from income stream is exchanged for the present value of the income stream. Such transactions are well known to those with skill in the art of finance. Alternatively, the principal investment vehicle can be exchanged for a zero coupon bond, wherein the discount represents the present value of the income stream.

In step 440, shares in the selected hedge fund are issued. These shares are purchased when interest payments are received from the principal investment vehicle. In a preferred embodiment, if the income stream is monetized, many Investors' pooled, monetized funds are invested in a venture selected by the Hedge Fund Manager, and shares in the venture are issued pro rata. Further, additional hedge fund shares may be purchased when the hedge fund generates a return, as explained further in connection with step 460.

In step 450, hedge fund information is periodically updated. This information may comprise the net asset value of a share, per share fees, expenses and other costs related to the venture, capital gains and dividends generated by the venture. Ideally, such updated information is made available to the Investor via web browser.

In step 460, by prior election, returns generated by the hedge fund are either paid out to the Investor, or they are reinvested by issuing new hedge fund shares. If the Investor so elects, step 440 is repeated to increase, maintain or minimize dilution of the Investor's holdings in the hedge fund. Alternatively, the returns are paid out in cash as an electronic funds transfer to the Investor's Hedge Fund Sales and Marketing Account 320.

In step 470, when the second time horizon is reached, the Investor may redeem his shares in the hedge fund. In a preferred embodiment, the Hedge Fund Manager, with knowledge of the second time horizon, has converted all of the assets in the hedge fund to liquid assets which can easily be converted to cash and electronically transferred back to the Investor's Hedge Fund Sales and Marketing Account 320. Alternatively, the Investor may elect not to redeem shares in a hedge fund run as an ongoing concern. In such event, the Investor may redeem shares at will without penalty after the second time horizon has passed.

In step 480, when the first time horizon is reached, the principal investment vehicle is liquidated, and the Investor receives the principal invested. It should be noted that steps 470 and 480 can be performed in any order, depending upon the length of the first and second time horizons.

Figure 5:
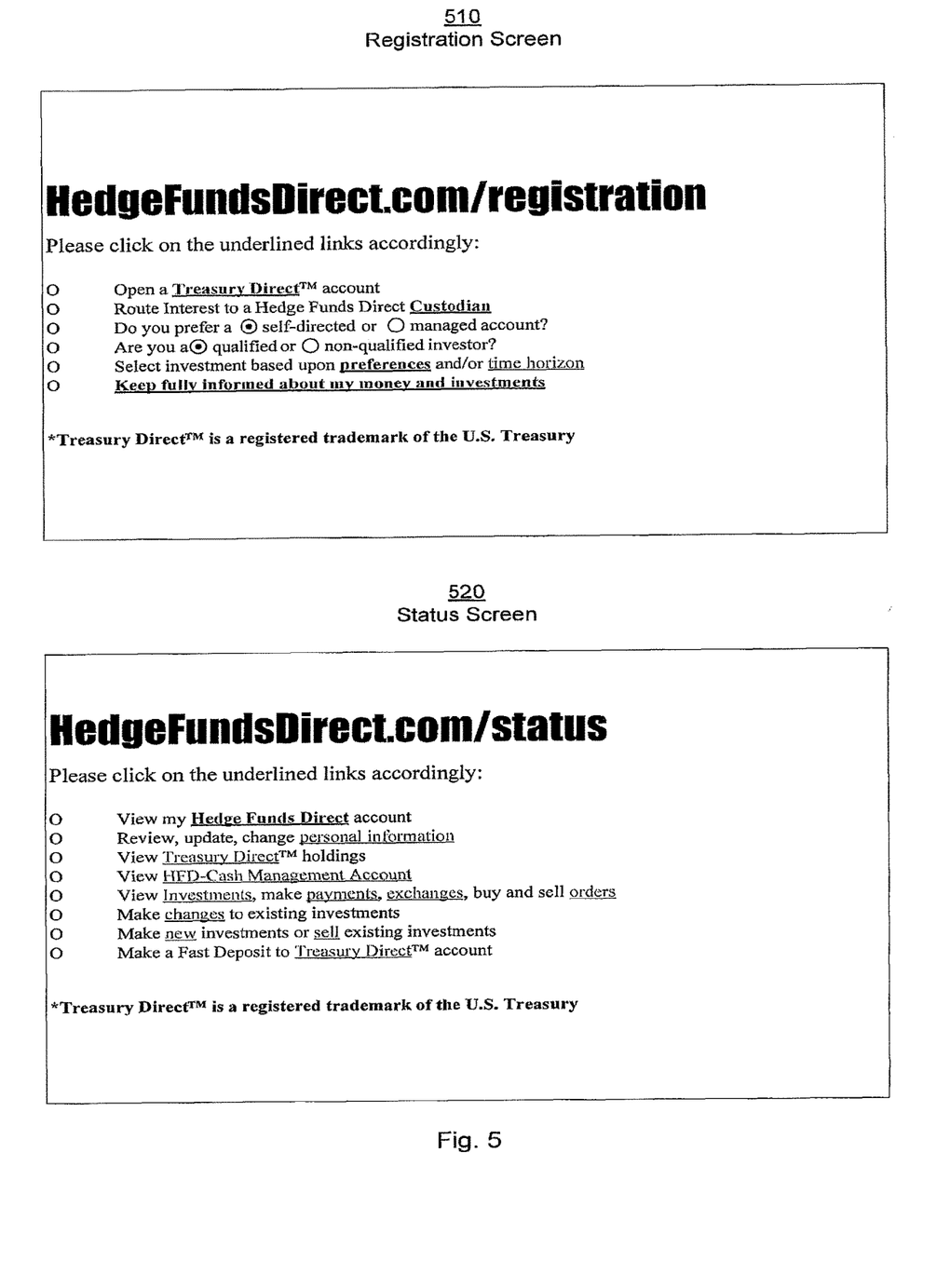
FIG. 5 is a screen diagram illustrating computer screens used by the investor.

FIG. 5 is a screen diagram illustrating computer screens used by the Investor. Screen 510 illustrates an exemplary registration screen presented to the Investor when registering at the web site. An Investor clicking on the Treasury Direct™ link will be directed to the U.S. Treasury's web site, where such account may be opened. An Investor clicking on the Custodian link will be directed to the Custodian's web site, where an appropriate Hedge Fund Sales and Marketing account can be opened. The Investor may then click settings for the new account, such as whether the account is self-directed or managed, qualified or non-qualified, and then select the investment vehicle based on preferences and the time horizons. An additional link will provide the investor with information concerning how the program works.

Screen 520 illustrates an exemplary status screen. An Investor clicking on the links presented in the screen may view all Hedge Funds Direct accounts, change personal information, view Treasury Direct™ holdings, view his Hedge Fund Sales and Marketing account, view investments, make payments, exchanges or enter buy or sell orders, make new investments, sell existing investments, or deposit funds into a Treasury Direct™ account.

Software on Media.

Figure 6:
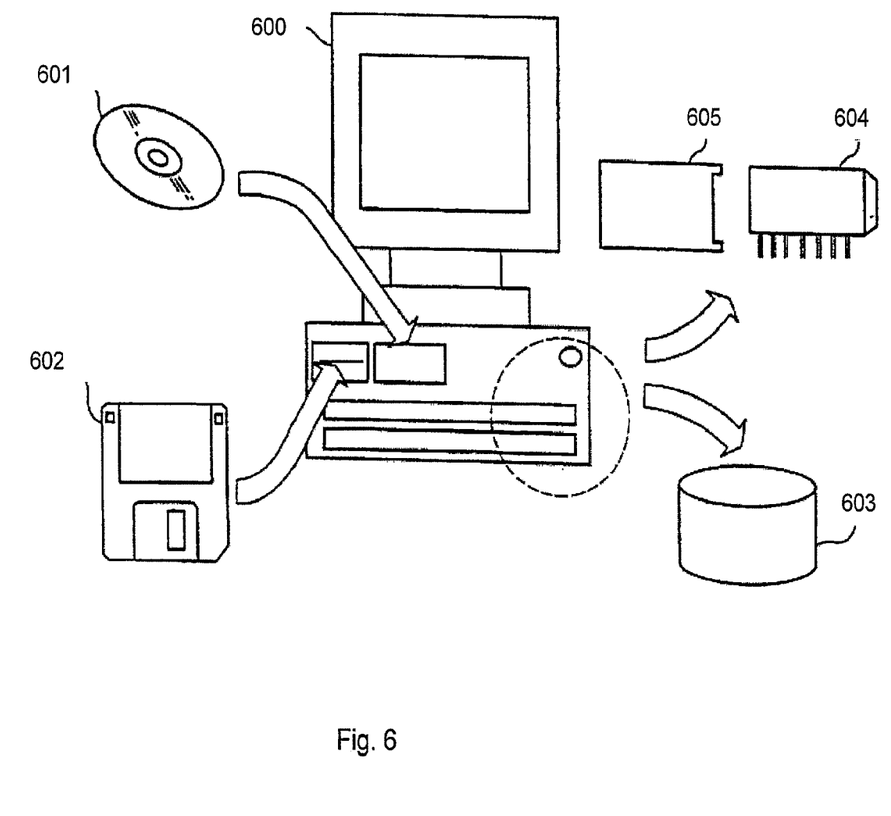
FIG. 6 illustrates examples of recording media.

In the specification, the term "media" means any medium that can record data therein. FIG. 6 illustrates examples of recording media.

The term "media" includes, for instance, a disk shaped media for 601 such as CD-ROM (compact disc-read only memory), magneto optical disc or MO, digital video disc-read only memory or DVD-ROM, digital video disc-random access memory or DVD-RAM, a floppy disc 602, a memory chip 604 such as random access memory or RAM, read only memory or ROM, erasable programmable read only memory or E-PROM, electrical erasable programmable read only memory or EE-PROM, a rewriteable card-type read only memory 605 such as a smart card, a magnetic tape, a hard disc 603, and any other suitable means for storing a program therein.

A recording media storing a program for accomplishing the above mentioned apparatus may be accomplished by programming functions of the above mentioned apparatuses with a programming language readable by a computer 600 or processor, and recording the program on a media such as mentioned above.

A server equipped with a hard disk drive may be employed as a recording media. It is also possible to accomplish the present invention by storing the above mentioned computer program on such a hard disk in a server and reading the computer program by other computers through a network.

As a computer processing device 600, any suitable device for performing computations in accordance with a computer program may be used. Examples of such devices include a personal computer, a laptop computer, a microprocessor, a programmable logic device, or an application specific integrated circuit.

Having thus described at least illustrative embodiments of the invention, various modifications and improvements will readily occur to those skilled in the art and are intended to be within the scope of the invention. Accordingly, the foregoing description is by way of example only and is not intended as limiting. The invention is limited only as defined in the following claims and the equivalents thereto.

The invention claimed is:

1. A system for enabling an investor to invest in a hedge fund, the system comprising:
    a processor coupled to a memory, a graphical user interface, and a control input device;
    a network in communication with a hedge fund web server and a U.S. Treasury Department Direct computer; and
    a program code stored in the memory, that, when executed by the processor and in response to manipulation of the control input device, causes the processor to:
    receive through a dynamic display portion of the graphical user interface a plurality of United States Treasury financial instrument information from the U.S. Treasury Department Direct computer;
    receive a selection via the control input device by the user for purchase of a United States Treasury financial instrument having a financial principal that generates an income stream,
    wherein the income stream is dynamically calculated and displayed on the dynamic display portion of the graphical user interface;
    receive a selection via the control input device by the user for a first time horizon;
    receive a selection from a particular area on the graphical user interface, for hedge fund information through the dynamic display portion of the graphical user interface from the hedge fund web server;
    receive a selection via the control input device for the hedge fund, wherein the hedge fund has a second time horizon; and
    issue shares to the investor in the hedge fund purchased with at least a portion of the income stream from the United States Treasury financial instrument before the first time horizon, wherein shares are issued automatically; and
    wherein generated assets from the hedge fund at the second time horizon are automatically transferred by the processor to an electronic funds transfer account.

2. The system of claim 1, wherein the program code further causes the processor to reinvest interest earned on principal from the hedge fund back into the hedge fund.

3. The system of claim 1, wherein the United States Treasury financial instrument is selected from the group of securities consisting of: Certificates of Deposit, U.S. Notes, U.S. Bonds, Treasury bills, or U.S. Treasury Inflation-Protected Securities.

4. The system of claim 1, wherein the program code further causes the processor to redeem the United States Treasure financial instrument at a time other than the first time horizon and to charge a penalty for redemption.

5. The system of claim 1, wherein the program code further causes the processor to redeem the hedge fund shares at other than the second time horizon and to charge a penalty for redemption.

6. The system of claim 1, wherein the program code further causes the processor to periodically update a net asset value per share of the hedge fund shares.

7. The system of claim 6, wherein the program code further causes the processor to display dynamically the periodically updated net asset value per share of the hedge fund shares.

\* \* \* \* \*